(12) United States Patent
Schlagenhauf

(10) Patent No.: US 6,453,751 B1
(45) Date of Patent: Sep. 24, 2002

(54) DEVICE FOR MEASURING PULLING-IN FORCE

(75) Inventor: Uwe Schlagenhauf, Sigmaringen-Laiz (DE)

(73) Assignee: Joerg Guehring, Albstadt (DE)

(*) Notice: Subject to any disclaimer, the term of this patent is extended or adjusted under 35 U.S.C. 154(b) by 0 days.

(21) Appl. No.: 09/719,175
(22) PCT Filed: Jun. 11, 1999
(86) PCT No.: PCT/EP99/04046
§ 371 (c)(1),
(2), (4) Date: Dec. 15, 2000
(87) PCT Pub. No.: WO99/65648
PCT Pub. Date: Dec. 23, 1999

(30) Foreign Application Priority Data

Jun. 15, 1998 (DE) ............................... 198 26 577

(51) Int. Cl.$^7$ ............................................. G01N 3/08
(52) U.S. Cl. ........................................... 73/831; 73/832
(58) Field of Search ................... 73/862.49, 862.541, 73/862.392, 862.54, 865.9, 831, 832; 29/243, 523; 409/232

(56) References Cited

U.S. PATENT DOCUMENTS

| | | | | |
|---|---|---|---|---|
| 3,554,299 A | * | 1/1971 | Sullivan | 175/4.55 |
| 4,292,852 A | * | 10/1981 | Morris | 73/827 |
| 4,856,349 A | * | 8/1989 | Huser | 73/862.54 |
| 5,741,981 A | * | 4/1998 | Ling et al. | 73/862.49 |
| 6,383,102 B1 | * | 5/2002 | Onogi | 474/18 |

FOREIGN PATENT DOCUMENTS

| | | |
|---|---|---|
| DE | 28 46 337 | 5/1979 |
| DE | 31 51 048 | 7/1983 |
| DE | 38 34 089 | 4/1989 |
| DE | 38 29 846 | 3/1990 |
| DE | 91 12 643 | 5/1992 |
| DE | 42 17 092 | 8/1993 |
| DE | 43 22 317 | 10/1994 |
| DE | 44 21 450 | 2/1995 |
| DE | 44 33 688 | 3/1996 |
| EP | 0 303 564 | 2/1989 |
| EP | 0 356 636 | 3/1990 |

OTHER PUBLICATIONS

Patent Abstracts of Japan, JP 10 080841, Mar. 31, 1998.
Patent Abstracts of Japan, vol. 8, No. 120 (M–300), Jun. 6, 1984, JP 59 024944, Feb. 8, 1984.

* cited by examiner

*Primary Examiner*—Max Noori
(74) *Attorney, Agent, or Firm*—Oblon, Spivak, McClelland, Maier & Neustadt, P.C.

(57) ABSTRACT

A device for measuring a pulling-in force of a clamping system provided on a handling device of a machine tool. The device includes a support part having a support surface configured to contact a support surface provided on the handling device, and a pulling-in part movable relative to the support part, which is configured to be subjected to a pulling-in force acting in axial direction during operation of the clamping system. Also included is a deformation body disposed within an interior of the support part and firmly connected between the support part and the pulling-in part. The deformation body is subjected to deformation as a function of the pulling-in force applied to the pulling-in part. A measuring device is also included that is configured to mechanically sense the deformation of the deformation body, and configured to determine a magnitude of the pulling-in force based on a sensed degree of deformation of the deformation body.

17 Claims, 3 Drawing Sheets

DEVICE FOR MEASURING PULLING-IN FORCE

FIELD OF THE INVENTION

The present invention relates to a device for measuring the pulling-in force to which a tool support part, such as a tool system module in the form, for example, of a basic tool mounting means, is subjected during coupling to an associated handling device, such as a spindle of a machine tool in the form, for example, of a drilling machine, lathe or milling machine, during operation of a clamping system provided on the handling device. Any component provided with a suitably adapted clamping system for coupling of a tool support part including, for example, a further tool system module, can be regarded as such a handling device.

DISCUSSION OF THE BACKGROUND

In the course of industrial development of modern manufacturing installations equipped with automatic tool-changing systems, the need for tool systems of modular construction has become increasingly greater. As an example, there is used in the basic tool mounting means of such systems a clamping shank manufactured with great precision, to which shank a system of different tools can be coupled. The coupling or clamping system for coupling the basic tool mounting means, an example of which is an HSK (hollow-shank taper) mounting means to a machine-tool spindle must meet stringent requirements as to stable and nonpositive connection in the region of the interface between the components to be coupled. If, for example, the actual pulling-in force is smaller than the specified pulling-in force stipulated by the machine manufacturer, the dynamic relationship between machine-tool spindle and basic tool mounting means deteriorates. This leads to a reduction of cutting performance, increased tool wear, possibly even tool break, shorter useful life, poorer attainable surface quality and stress on the machine-tool spindle and guideways. The magnitude and constancy of the pulling-in force is therefore of paramount importance for coupling of a basic tool mounting means to a machine-tool spindle.

Not only conventional steep-taper interfaces but also numerous other manufacturer-specific interfaces are used in industry as interface connections. The main types, however, are the hollow-shank taper interfaces, in which an axial extension of a component such as the aforementioned basic tool mounting means, which extension is constructed as a hollow-shank taper, is pulled into a matching mounting means on a handling device such as the aforementioned machine-tool spindle, during operation of a clamping system such as a three-claw clamping system.

To ensure the function of the clamping system, or in other words the necessary clamping or pulling-in force, all clamping systems must have the technical test capability of measuring the pulling-in force. The devices for measuring pulling-in force that are now commonplace operate electronically and, because of extremely complex techniques involving strain gauges, are relatively expensive and sensitive to shock and dirt under production conditions. In addition, electronic devices for measuring pulling-in force require a supply of energy from, for example, the power line or batteries.

As an example, there is known from German Unexamined Application 3829846 an electronic system for measuring the pulling-in force of tool-clamping jigs of machine tools, which are provided with a spindle tool mounting means for a tool shank and a clamping member for axially clamping the tool shank on the tool mounting means. The system for measuring pulling-in force comprises a test shank formed in one piece on the tool mounting means and designed for clamping connection to the clamping member, which shank is provided with a measuring member influenced by the clamping force for influencing a sensing device for the clamping force. The measuring member is a measuring body which senses the clamping force by mechanical deformation, and which can comprise, for example, one or more strain gauges.

SUMMARY OF THE INVENTION

The object of the present invention is now to provide, for measuring the pulling-in force to which a tool support part is subjected during coupling to an associated handling device, a device for measuring pulling-in force which, compared with the conventional devices for measuring pulling-in force, is inexpensive, impact-resistant, insensitive to dirt, of compact construction and operates independently of external energy.

This object is achieved by a device for measuring pulling-in force according to the features of claim 1.

According to the invention there is provided a device for measuring pulling-in force in which the pulling-in force on a pulling-in part is measured on the basis of a certain physical effect, in which a well-defined relationship exists between the force applied to the deformation body via the pulling-in part and the resulting change of shape of the deformation body. Depending on the structural design and the functional interaction of the individual components of the device for measuring pulling-in force, the pulling-in force exerted on the pulling-in part can be transmitted as a tensile or compressive force to the deformation body, whereby the deformation body is subjected to corresponding elongation or compression. From the associated change in length of the deformation body, the force applied to the deformation body and thus to the pulling-in part can ultimately be measured in simple manner, for example by means of a mechanical force transducer, on the basis of the well-defined relationship between force and length change. The inventive device for measuring pulling-in force can therefore operate purely mechanically and completely independently of the power line or batteries. Furthermore, it is characterized by a structure which is relatively simple and therefore inexpensive from the engineering viewpoint, and which can be used successfully in the simplest form without any electronics.

The inventive device for measuring pulling-in force is also characterized by great flexibility of use. Essentially it can be used for measuring the clamping force of all interface clamping systems, or in other words on all common interface connections in which two parts to be coupled are clamped axially to one another. As an example, if the pulling-in force of a basic tool mounting means is to be measured in a mounting means provided on a machine-tool spindle, the inventive device for measuring pulling-in force is coupled instead of the basic tool mounting means to the machine-tool spindle. The inventive device for measuring pulling-in force is therefore provided with constructively essential features that can also be found in a basic tool mounting means, or in other words a support surface which, during coupling to the machine-tool spindle, becomes braced against a support surface provided thereon, as well as a pulling-in part that functions as the pulling-in shank of the basic tool mounting means and that is subjected to the pulling-in force of the clamping system. In contrast to the basic tool mounting means, however, the support surface in the inventive device for measuring pulling-in force is constructively separate from the pulling-in part functioning as the shank, and so the pulling-in part can be moved relative to the support part. The support part and the pulling-in part are connected to one another, as described hereinabove, by the deformation body.

Advantageous embodiments of the inventive device for measuring pulling-in force are subject matter of the dependent claims.

In the improvement according to a second example, the deformation body is also advantageously chosen and, in view of the maximum forces to be expected during operation of the clamping system, is dimensioned such that it is subjected to elastic deformations during operation of the clamping system. In this case a linear force-deformation relationship can be used for measurement of the pulling-in force.

The choice of support-surface pair between the support part and the handling device as annular plane surfaces according to a third example permits stable coupling, free of transverse forces, of the inventive device for measuring pulling-in forces to the handling device, and thus also reliable measurement of the pulling-in force.

The improvement according to a fourth example allows for the fact that conventional tool support parts for coupling to a handling device are often provided with a taper shank to be pulled into an axial mounting means provided on the handling device, and thus it permits the most practical possible measurement of the pulling-in forces applied to the tool support parts.

With the improvement according to a fifth example, the frictional forces that normally occur between the generating surface of the shank portion and the inside generating surface of the mounting means when the shank portion is pulled into the mounting means are excluded, thus permitting measurement of the maximum pulling-in force of the clamping system. The cross sections of the support part, pulling-in part and deformation body are chosen such that the shank portion of the pulling-in part can still be pulled with clearance into the mounting means of the handling device even in the case of development of the maximum forces to be expected and thus maximum length changes.

According to a sixth example, the shank portion preferably has the form of a hollow-shank taper; nevertheless, in view of the shanks that are now commonplace, it can also have a different form, such as the form of a steep taper.

To provide the inventive device for measuring pulling-in force with a structure that is as compact and insensitive to dirt as possible, the support part according to a seventh example advantageously has the form of a bell, which shields from the outside environment a cylindrical portion of the pulling-in part axially adjoining the shank portion as well as the deformation body inserted between the support part and the pulling-in part.

According to an advantageous improvement according to eighth and ninth examples, the deformation body is an extensible body connected firmly to the cylindrical portion of the pulling-in part and/or to the support part, for example by being screwed together therewith, so that in this case a length change proportional to the tensile load is used in the form of elongation of the extensible body for measurement of the pulling-in force. As the extensible body there is preferably used a reduced-shaft bolt. It would also be conceivable, however, to use a spring body.

In connection with the use of a conventional mechanical dial gauge as the device for sensing the deformation of the reduced-shaft bolt, a tenth example shows an advantageous improvement of the reduced-shaft bolt wherein the reduced-shaft bolt is provided with an axial bore, in which there is inserted a pin which is connected functionally to the device for sensing the deformation of the reduced-shaft bolt, the pin being in the case of the dial gauge, for example, an extension of the measuring pin.

With the improvement according to an eleventh example, according to which an adjusting device for adjusting the axial length of the pin is provided, there is obtained in simple manner the capability of precision adjustment of the measurement range of the device for sensing the deformation. According to a twelfth example, the adjusting device is constructed for simplicity as a setscrew, for example a hexagon socket screw, which is screwed into a threaded bore formed in the end portion of the reduced-shaft bolt, which portion is screwed together with the cylindrical portion of the pulling-in part.

The improvement according a thirteenth example, according to which the shank portion is cylindrical, provides a further possible application of the inventive device for measuring pulling-in force; for example, the principle of the inventive device for measuring pulling-in force can also be applied to a VDI shank interface connection.

BRIEF DESCRIPTIONS OF THE DRAWINGS

Preferred practical examples of the inventive device for measuring pulling-in force will be explained hereinafter with reference to schematic drawings, wherein.

DESCRIPTION OF THE PREFERRED EMBODIMENTS

Figure 1:
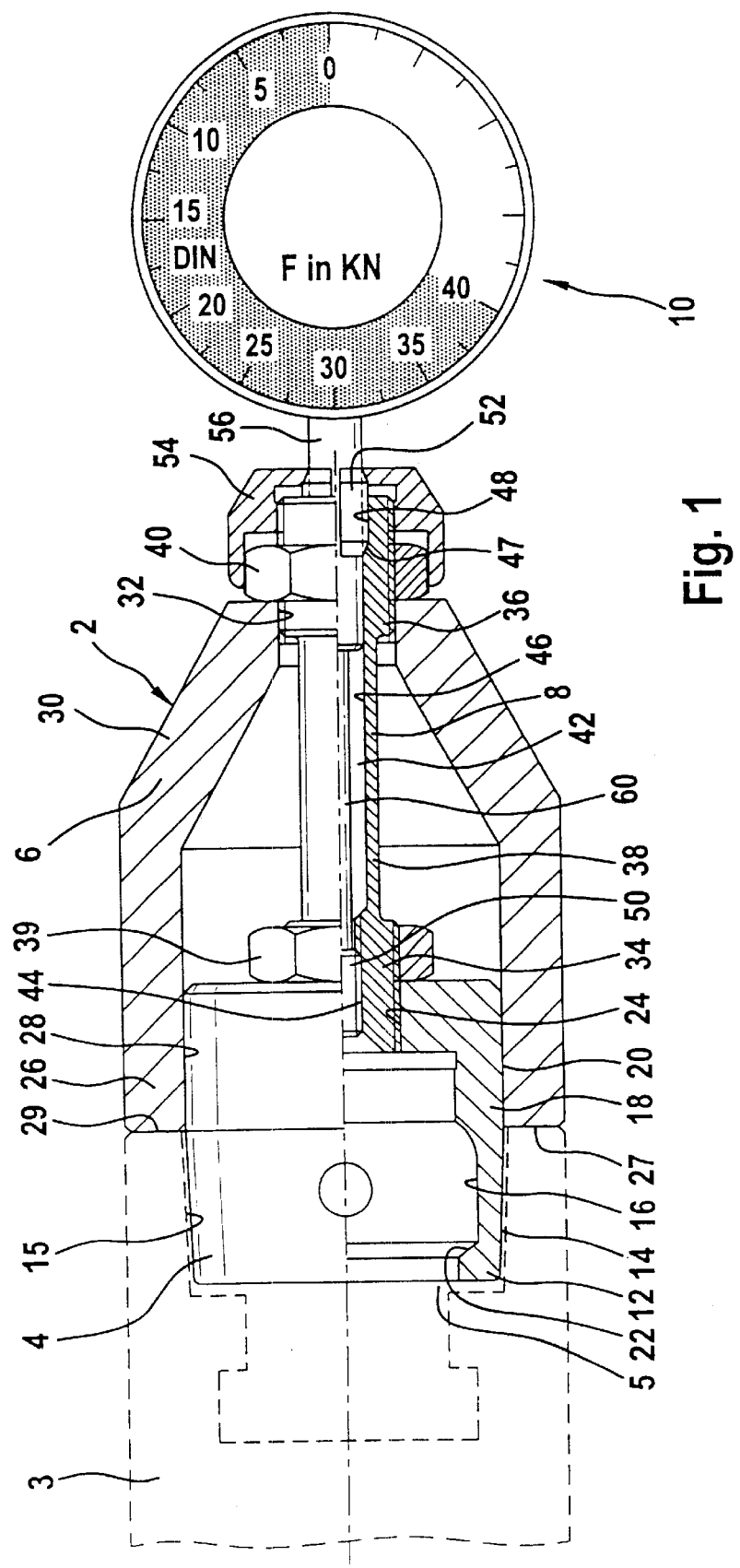
FIG. 1 shows a first practical example of the inventive device for measuring pulling-in force for application to a hollow-shank taper interface.

In FIG. 1 there is shown as a first practical example of the present invention a device for measuring pulling-in force denoted by reference numeral 2, which device was developed for measurement of the axial pulling-in force of a clamping system of a hollow-shank taper (HSK) interface connection, such as an HSK-100 interface connection. Furthermore, reference numeral 3 denotes a machine-tool spindle functioning as a handling device, which is schematically illustrated in FIG. 1 by dashed lines. Device 2 for measuring pulling-in force comprises substantially a pulling-in part 4, a support part 6, a reduced-shaft bolt 8 functioning as the deformation body and a dial gauge 10 functioning as the force-sensing device. These components will be described in more detail hereinafter.

As is evident from the diagram in FIG. 1, pulling-in part 4, which for manufacturing-related reasons is constructed as a rotationally symmetric body, has a shank portion 12 in the form of a hollow-shank taper (HSK) with a tapered generating surface 14 on its outside and an internal recess 16 undercut or relieved per DIN standard on its inside, as well as a guide portion 18 with a cylindrical generating surface 20 on its outside. In order to measure the axial pulling-in force of a clamping system (not illustrated) provided on machine-tool spindle 3, shank portion 12 is inserted in a mounting means 5 provided on the machine-tool spindle. Upon operation of the clamping system, clamping elements (also not illustrated) are swiveled into internal recess 16 until wedging faces formed on the clamping elements bear snugly and with increasing contact force against an inclined face 22 of internal recess 16. The axial component of the resulting normal forces between the wedging faces on the clamping elements and inclined face 22 on internal recess 16 leads to a tensile load on the clamping elements, whereby pulling-in part 4 is pulled into mounting means 5 of machine-tool spindle 3.

The cross section of shank portion 12 is chosen such that clearance is left between tapered generating surface 14 of shank portion 12 and tapered generating surface 15 provided in mounting means 5 of machine-tool spindle 3. By virtue of these features, frictional forces between shank portion 12 and mounting means 5 are excluded during measurement of the pulling-in force.

As shown in FIG. 1, there is formed in cylindrical portion 18 of pulling-in portion 4 a central threaded hole 24, into which there is screwed an end portion 34 of reduced-shaft bolt 8, which will be explained in more detail hereinafter.

In this practical embodiment, support part 6 has the form of a rotationally symmetric bell, which has a portion 26 with a cylindrical inside generating surface 28 for receiving cylindrical portion 18 of pulling-in part 4 as well as a portion 30 which tapers away from pulling-in part 4. During coupling of device 2 for measuring pulling-in force to machine-tool spindle 3, support part 6 becomes braced, via an annular plane surface 27 of portion 26 functioning as a support surface, against a corresponding mating surface 29 of machine-tool spindle 3. At the tip of tapering portion 30 there is formed, in alignment with threaded bore 24 in cylindrical portion 18 of pulling-in part 4, a threaded bore 32, into which there is screwed the other end portion 36 of reduced shaft bolt 8.

The cross sections of pulling-in part 4 and of support part 6 are chosen in such a way, considering the maximum forces to be expected during coupling to the machine-tool spindle, that they are subjected to the smallest possible shape change, or in other words elongation or compression, so that this change has only a minor influence on the measured result and can be taken into consideration in the calculation of the pulling-in force.

Reduced-shaft bolt 8 functioning as the deformation body connects pulling-in part 4 to support part 6. For this purpose the two end portions 34 and 36 of reduced-shaft bolt 8 are screwed together in the form of threaded portions with pulling-in part 4 and support part 6, respectively, as already mentioned hereinabove. As shown in FIG. 1, the two end portions 34 and 36 have larger cross section than does a middle portion 38 disposed therebetween. Thereby it is ensured among other aspects that any elongation of these end portions 34 and 36 that occurs during coupling of device 2 for measuring pulling-in force to the machine-tool spindle is small compared with the elongation of middle portion 38 and so, as in the case of pulling-in part 4 and support part 6, it has only a minor influence on the measured result and can be taken into consideration during calculation of the pulling-in force.

As mentioned hereinabove, support part 6 is braced via its support surface 27 against support surface 29 of machine-tool spindle 3 during coupling of device 2 for measuring pulling-in force to machine-tool spindle 3. In the process, pulling-in part 4 is pulled relative to support part 6 into mounting means 5, whereby reduced-shaft bolt 8 is loaded in tension. This in turn has the consequence that reduced-shaft bolt 8 is subjected in its middle portion 38, which is the weakest portion, to a length change or in other words elongation which is proportional to the pulling-in force, and which is used for measurement of the pulling-in force. In particular, the cross section of middle portion 38 of reduced-shaft bolt 8 is chosen such that, even at the maximum forces to be expected, there takes place an elastic shape change, which therefore obeys Hooke's law, $\epsilon = \sigma/E$, where $\epsilon$ represents the elastic strain, $\sigma$ the normal stress and E the modulus of elasticity.

In this practical example, the elongation of extensible part 8 and thus the pulling-in force acting on pulling-in part 4 is measured by means of a mechanical dial gauge 10. With knowledge of the linear relationship between pulling-in force and elongation of reduced-shaft bolt 8, therefore, it is possible in simple manner to convert the elongation of reduced-shaft bolt 8 into a proportional pulling-in force.

The cross sections of the components of device 2 for measuring pulling-in force, or in other words of pulling-in part 4, support part 6 and reduced-shaft bolt 8 are, as already mentioned hereinabove, chosen specially such that the maximum forces to be expected during coupling of device 2 for measuring pulling-in force to the machine-tool spindle produces a total elongation of all components which remains in a permissible range, in order to prevent contact between shank portion 12 and mounting means 5 and thereby to exclude the frictional forces between tapered generating surface 14 of shank portion 12 and tapered generating surface 15 provided in mounting means 5.

As can be seen in FIG. 1, reduced-shaft bolt 8 is secured against loosening or separation by means of nuts 38 and 40, which are screwed onto end portions 34 and 36 respectively and thus clamp reduced-shaft bolt 8 against pulling-in part 4 and support part 6 respectively. Reduced-shaft bolt 8 is also provided with an axial internal bore 42 extending over its entire length and comprising three bore portions 44, 46, 48 with inside diameters increasing in the foregoing order. Bore portion 44 of internal bore 42, or in other words the portion with the smallest inside diameter, is formed in end portion 34 of reduced-shaft bolt 8, which is screwed into cylindrical portion 18 of pulling-in part 4, and is provided with an internal thread. This bore portion serves to receive a setscrew 50, for example in the form of a hexagon socket screw, whose function will be explained hereinafter. Bore portion 46 with the second-largest inside diameter extends in axial direction through middle portion 38 up to approximately the middle of end portion 36 of reduced-shaft bolt 8. Bore portion 48 with the largest inside diameter begins at bore portion 46 and extends through the remaining part of end portion 36. Between bore portion 46 and bore portion 48 there is formed a tapered transition surface 47, against which there bears a tapered wedging face of a split clamping bushing 52 housed in bore portion 48. Clamping bushing 52 has the function, by tightening of a nut 54 which, following lock nut 40, is also screwed onto end portion 36 of reduced-shaft bolt 8, of clamping firmly together with reduced-shaft bolt 8, as illustrated in FIG. 1, a tubular extension 56 of dial gauge 10 that extends through bore portion 48 and into bore portion 46 of reduced-shaft bolt 8. A measuring pin 60 of dial gauge 10, which projects from tubular extension 56 of dial gauge 10 and functions as a pin, extends through bore portion 46 until it abuts against setscrew 50 mentioned hereinabove. By means of said setscrew 50, the axial position of measuring pin 60 can be adjusted and thus an initial stress or precision adjustment of dial gauge 10 can be established.

Dial gauge 10 used in this practical example has a resolution of 0.001 mm. For measurement of the pulling-in force, dial gauge 10 is subjected to an initial stress by means of setscrew 50 at about 0.1 mm, and is then zeroed. Under the action of the pulling-in force and the resulting elongation of reduced-shaft bolt 8, the initial stress of dial gauge 10 is relaxed in proportion to the pulling-in force, so that the pointer is deflected in the counterclockwise sense, as shown in FIG. 1. Sheets bearing numbers specific to the respective interface connections are used to permit the force to be read directly.

The operation and functional principle of inventive device 2 for measuring pulling-in force will be explained hereinafter.

As was explained hereinabove, device 2 for measuring pull-in force is coupled to machine-tool spindle 3 for measurement of the pulling-in force of a clamping system provided on machine-tool spindle 3. For this purpose shank portion 12 of pulling-in part 4 is inserted into mounting means 5 on machine-tool spindle 3. Upon operation of the clamping system, pulling-in part 4 is pulled into mounting means 5, as was also explained already hereinabove, until support surface 27 of support part 6 comes into contact with support surface 29 provided on machine-tool spindle 3. The further pulling-movement of pulling-in part 4 relative to support surface 27 of support part 6 causes a change in length, or in other words elongation of reduced-shaft bolt 8 and thus relaxation of the initial stress generated before insertion of device 2 for measuring pulling-in force. This relaxation of the initial stress results, as mentioned hereinabove, in a negative deflection of the pointer of dial gauge 10, whereby the pulling-in force ultimately can be directly read on the number-bearing sheet.

Even though the design and functional principle of inventive device 2 for measuring pulling-in force are technically relatively simple, a high measurement accuracy of ±3% is surprisingly achieved. This comes very close to the measurement accuracy of electronic devices which are now commonly used for measuring pulling-in force and which are technically very complex.

Figure 2:
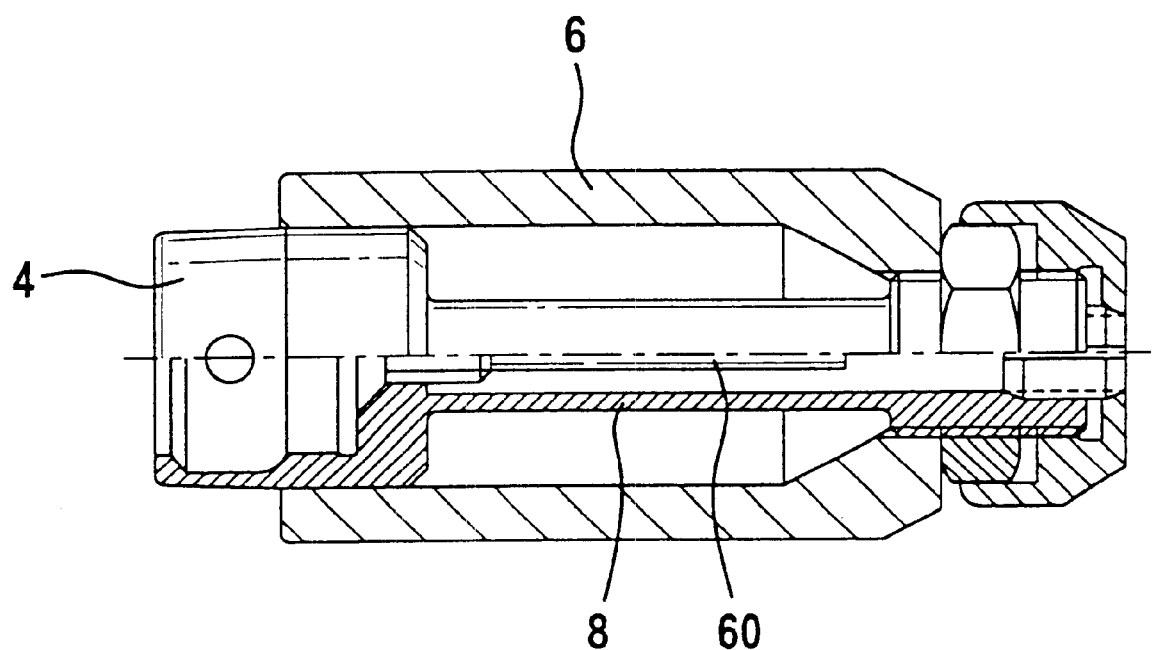
FIG. 2 shows a modification of the first practical example of the inventive device for measuring pulling-in force.

FIG. 2 shows a modification of the first practical example of inventive device 2 for measuring pulling-in force illustrated in FIG. 1. For simplicity, dial gauge 10 illustrated in FIG. 1 is no longer shown in FIG. 2. In this modification pulling-in part 4 and reduced-shaft bolt 8 are made in one piece, so that, besides the simpler manufacture resulting from the one-piece design, lock nut 38 illustrated in FIG. 1 is no longer required. This is possible in particular for interface connections with small diameters, such as in HSK-25, HSK-30 or HSK-32 interfaces, where pulling-in part 4 therefore has small diameter.

Figure 3:
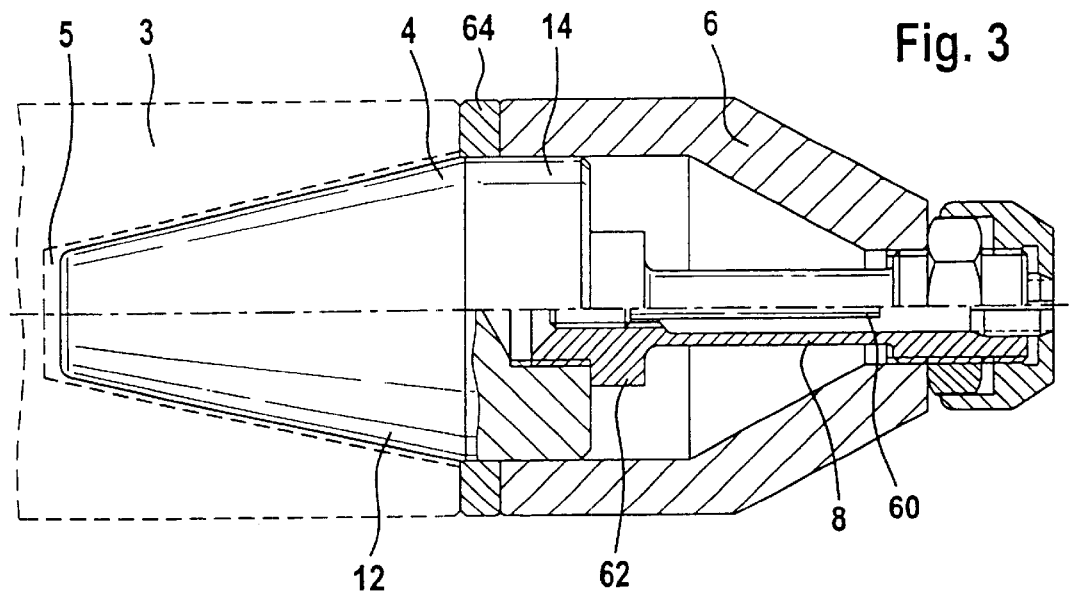
FIG. 3 shows a second practical example of the inventive device for measuring pulling-in force for application to a steep-taper interface.
Figure 4:
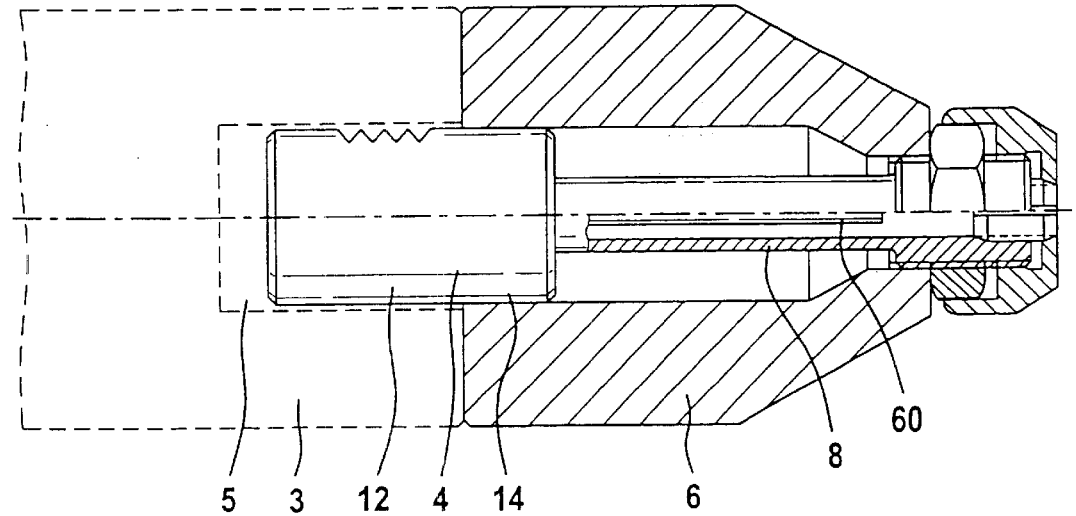
FIG. 4 shows a third practical example of the inventive device for measuring pulling-in force for application to a VDI or cylindrical interface.

FIG. 3 shows a second practical example of the inventive device for measuring pulling-in force for use on a steep-taper interface connection, and lastly FIG. 4 shows a third practical example of the inventive device for measuring pulling-in force for use on a VDI interface connection. As in the case of FIG. 2, and again for simplicity, dial gauge 10 illustrated in FIG. 1 is no longer shown in FIGS. 3 and 4. The second and third practical examples correspond in their essential features to the first practical example, specifically in that the main structure with pulling-in part, support part, deformation body and force-sensing device as well as the functional principle remain unchanged.

In the second practical example, shank portion 12 according to the diagram in FIG. 3 has the form of a steep taper, and in the third practical example according to the diagram in FIG. 4 it has the form of a cylindrical VDI shank. It is expressly pointed out here that the inventive device for measuring pulling-in force is in principle applicable to all interface connections in which a component such as a tool support part is coupled to a second component such as a machine-tool spindle via an axial pulling-in force.

As follows from the diagram of FIG. 3, lock nut 38 of the first practical example illustrated in FIG. 1 is in this second practical example replaced by a shoulder 62 formed as an annular projection and designed preferably for operation with a wrench or other tool. Furthermore, an additional adapter ring 64 can be inserted between machine-tool spindle 3 and the device for measuring pulling-in force, if such seems necessary for assembly reasons.

In the third practical example, and as illustrated in FIG. 4, reduced-shaft bolt 8 and pulling-in part 4 are formed together in one piece, as in the case of the modification illustrated in FIG. 2 of the first force-measuring device 2.

In the first and second practical examples, reduced-shaft bolt 8 was screwed together both with pulling-in part 4 and support part 8. However, the present invention is not limited merely to those examples. It would also be conceivable to connect reduced-shaft bolt 8 positively and/or nonpositively to pulling-in part 4 and support part 6 in some other manner, an example being in the form of a quarter-turn fastener. As shown in the modification of the first practical example in FIG. 2 and in the third practical example in FIG. 4, pulling-in part 4 and reduced-shaft bolt 8 can also be formed together in one piece, for example, in the case of small diameters. Furthermore, it would also be possible in the cases cited hereinabove, in which reduced-shaft bolt 8 is screwed together with support part 6, to connect reduced-shaft bolt 8 to support part 6 positively or nonpositively in some other manner, for example to the effect that end portion 36 of reduced-shaft bolt 8 is held against support part 6 by a one-piece retaining ring or shoulder under tensile load.

Finally, it is also pointed out that the features of the practical examples described hereinabove obviously can be combined with one another in any way that is technically possible and appears to be expedient.

What is claimed is:

1. A device for measuring a pulling-in force of a clamping system provided on a handling device of a machine tool, the device comprising:

a support part having a support surface configured to contact a support surface provided on the handling device;

a pulling-in part movable relative to the support part, and configured to be subjected to a pulling-in force acting in an axial direction during operation of the clamping system;

a deformation body disposed within an interior of the support part and firmly connected between the support part and the pulling-in part, and configured to be subjected to deformation as a function of the pulling-in force applied to the pulling-in part; and a measuring device configured to mechanically sense the deformation of the deformation body and configured to determine a magnitude of the pulling-in force based on a sensed degree of deformation of the deformation body.

2. A device for measuring the pulling-in force according to claim 1, wherein dimensions of the deformation body are selected in view of maximum forces to be expected during operation of the clamping system and so the deformation of the deformation body that occurs during operation of the clamping system obeys Hooke's law.

3. A device for measuring the pulling-in force according to claim 1 or 2, wherein the support surface of the support part comprises an annular plane surface configured to contact an annular plane surface provided on the handling device.

4. A device for measuring the pulling-in force according to one of claims 1 to 2, wherein the pulling-in part includes a tapered shank portion configured to be pulled into an axial mounting member provided on the handling device.

5. A device for measuring the pulling-in force according to claim 4, wherein the cross sections of the support part, the pulling-in part and the deformation body are selected so a clearance exists between the shank portion and the mounting member even when maximum forces are applied.

6. A device for measuring the pulling-in force according to claim 5, wherein the shank portion has a form of a hollow-shank taper or steep taper.

7. A device for measuring the pulling-in force according to one of claims 1 to 2, wherein the pulling-in part has a cylindrical shank portion configured to be pulled into an axial mounting member provided on the handling device.

8. A device for measuring the pulling-in force according to one of the preceding claims, wherein the support part has a form of a bell, and the pulling-in part has a cylindrical portion, which axially adjoins the shank portion and is received in the bell.

9. A device for measuring the pulling-in force according to claim 8, wherein the deformation body comprises an extensible body connected firmly to the cylindrical portion of the pulling-in part and the support part.

10. A device for measuring the pulling-in force according to claim 9, wherein the extensible body comprises a reduced-shaft bolt, which is screwed together with the cylindrical portion of the pulling-in part and the support part.

11. A device for measuring the pulling-in force according to claim 10, wherein the reduced-shaft bolt includes an axial bore configured to receive a measuring pin of the measuring device.

12. A device for measuring the pulling-in force according to claim 11, wherein the reduced-shaft bolt is provided on an end portion screwed into the cylindrical portion of the pulling-in part with an adjusting device, which by adjustment of an axial position of the pin inserted in the reduced-shaft bolt, permits an initial stress to be applied to the device.

13. A device for measuring the pulling-in force according to claim 12, wherein the adjusting device comprises a setscrew, which is screwed into a threaded bore formed in the end portion of the reduced-shaft bolt, which portion is screwed into the cylindrical portion of the pulling-in part.

14. A device for measuring the pulling-in force according to claim 3, wherein the pulling-in part has a cylindrical shank portion configured to be pulled into an axial mounting member provided on the handling device.

15. A device for measuring the pulling-in force according to claim 1, wherein each end portion of the deformation body has a larger cross section than a middle portion disposed therebetween.

16. A device for measuring the pulling-in force according to claim 1, wherein the measuring device comprises a mechanical dial gauge.

17. A device for measuring the pulling-in force according to claim 3, wherein the pulling-in part includes a tapered shank portion configured to be pulled into an axial mounting member provided on the handling device.

* * * * *